(12) United States Patent
Sundholm et al.

(10) Patent No.: US 6,220,630 B1
(45) Date of Patent: Apr. 24, 2001

(54) STEERING WHEEL SUSPENSION SYSTEM

(76) Inventors: Lars Sundholm, Granvagen 8D, S-907 38 Umea; Mats Lindkvist, Arrendegatan 18, S-462 41 Vanersborg, both of (SE)

( * ) Notice: Subject to any disclaimer, the term of this patent is extended or adjusted under 35 U.S.C. 154(b) by 0 days.

(21) Appl. No.: 09/254,840

(22) PCT Filed: Sep. 16, 1997

(86) PCT No.: PCT/SE97/01567

§ 371 Date: Mar. 30, 1999

§ 102(e) Date: Mar. 30, 1999

(87) PCT Pub. No.: WO98/10960

PCT Pub. Date: Mar. 19, 1998

(30) Foreign Application Priority Data

Sep. 16, 1996 (SE) .................................................. 9603361

(51) Int. Cl.[7] .................................................. B62D 1/19
(52) U.S. Cl. .............................. 280/777; 280/779; 74/492
(58) Field of Search ................................. 280/775, 777, 280/779, 750, 780; 74/492, 493, 496, 498

(56) References Cited

U.S. PATENT DOCUMENTS

| | | | |
|---|---|---|---|
| 4,949,990 | * | 8/1990 | Hirahara et al. ........................ 280/750 |
| 5,188,392 | * | 2/1993 | Sugiki et al. .......................... 280/775 |
| 5,452,917 | * | 9/1995 | Fujiu et al. ............................ 280/777 |
| 5,503,431 | * | 4/1996 | Yamamoto ............................ 280/777 |
| 5,507,521 | * | 4/1996 | Steffens, Jr. .......................... 280/777 |
| 5,520,416 | * | 5/1996 | Singer, III et al. ..................... 280/775 |
| 5,678,454 | * | 10/1997 | Cartwright et al. ..................... 74/493 |
| 5,685,564 | * | 11/1997 | Iijima et al. .......................... 280/777 |
| 5,737,971 | * | 4/1998 | Riefe et al. ........................... 280/775 |

* cited by examiner

Primary Examiner—Daniel G. DePumpo
Assistant Examiner—Christopher Bottorff
(74) Attorney, Agent, or Firm—Young & Thompson

(57) ABSTRACT

A method and a steering wheel suspension system for reducing the extent of injuries sustained by a driver in the event of a head-on collision of a vehicle that includes a steering wheel fitted with an air bag and having a steering shaft (8) which is rotatably carried in a holder device for steering purposes, wherewith the holder device is, in turn, mounted for rotation about a support shaft (2) which is based from the steering shaft and extends across the vehicle and, under normal conditions, is locked in a determined position relative to the support shaft (2) by means of a breakable locking device (14). The system includes a collision-initiated drive mechanism located at a radial distance from the support shaft (2) and functioning to apply to the holder device a force which causes the device to swing about the support shaft (2) and bring the steering wheel shaft to a generally horizontal collision position in front of the driver, wherewith the steering wheel ring is brought to a generally vertical position in front of the driver of the vehicle.

10 Claims, 3 Drawing Sheets

STEERING WHEEL SUSPENSION SYSTEM

BACKGROUND OF THE INVENTION

The present invention relates to a method and to a system for reducing the risk of injury to the driver of a vehicle in the event of a head-on collision.

Essentially all cars are currently provided with steering wheel accommodated air bags with the intention of preventing injury to the driver.

However, an air bag is not able to absorb on its own the amount of energy required to arrest movement of an unbelted driver in the event of a head-on collision of, e.g., 50 km per hour. The air bag is intended to distribute the load uniformly over the head and chest of the driver, so that no part of the body will be subjected to local heavy loads. A major part of the kinetic energy concerned is normally absorbed in the steering wheel suspension. Vehicles fitted with air bags therefore have some form of collapsible steering wheel suspension, which is intended to collapse in a controlled manner so as not to exceed a chest acceleration limit of about 60 G.

In addition to being fitted with air bags, a number of vehicle models are also fitted with a so-called knee-bar structure. The knee-bar structure is intended to lessen the effects of hitting the underside of the instrument panel in the event of a head-on collision, and to absorb the kinetic energy of the lower part of the driver's body. The knee-bar is constructed so that the forces to which the driver's thighs are subjected will not exceed about 10 kN. The knee-bar is normally placed inwardly of the instrument panel or dashboard frame and is not therefore visible, said knee-bar normally being anchored in the vicinity of the steering wheel suspension.

The course of events that occur when the vehicle hits a barrier or is involved in a head-on collision can be described in the following way: When a vehicle hits a barrier, the front part of the vehicle will be deformed. The vehicle speed decreases at the same time as the driver continues to move essentially at the original, vehicle speed, causing the driver to gradually approach and finally reach the forwardly lying furnishings, i.e. the steering wheel suspension, steering wheel, air bag, and knee-bar. These components shall be dimensioned for controlled deformation, so as not to exceed the tolerance levels of the human body.

The characteristic that corresponds to front deformation of a vehicle is referred to in the art as the pulse of the vehicle. The pulse also describes the course of vehicle retardation during the collision. An aggressive pulse, i.e. a rigid front-part, results in marked retardation of the vehicle. A quiet, or peaceful, pulse, i.e. a soft front-part that has a long deformation distance, results in more gentle retardation. A quiet pulse is, of course, preferable with respect to those travelling in the vehicle, but results in a larger vehicle.

The worst collision sequence on the part of the driver is when the vehicle has stopped completely before the driver has begun to load the furnishings. This places a very high demand on the ability of the furnishing to absorb the kinetic energy of the driver. An optimal course of events can thus be described as one in which the driver is positioned so close to the furnishings as to load said furnishings initially prior to the crash or collision. The driver is then a part of the living mass of the vehicle and can thus avail himself/herself of the deformation zone of the front part of the vehicle as an extended braking distance, which reduces the loads.

A driver will be seated at roughly the same distance from the front furnishings irrespective of the size of the vehicle and consequently much greater demands are placed on the air bag system of a small car. Enhanced safety can be achieved by coupling or uniting the driver with the car as quickly as possible in the event of a collision, so as to limit the level of injuries sustained. Among other things, this requires a stable steering wheel suspension, so that a reaction force can be quickly built-up. When the steering suspension is too soft, it is able to deform without absorbing energy during the critical phase in which deformation of the car or vehicle is still in process. Another way of rapidly coupling the driver to the car is to use highly aggressive and hard air bags that will be inflated quickly and therewith quickly couple the driver to the car.

The majority of steering wheel suspension systems have a common mode of behaviour which dramatically influences the function of the system in a virtual traffic environment.

When an unbelted driver reaches the front furnishings during a collision, it is the driver's knees that first come into contact with said furnishings, due to the fact that the driver's knees are usually those parts of his/her body that are located closest to the furnishings. When the knees exert force on the knee-bar, the bar forces up the steering wheel suspension, which, in turn, means that the steering wheel is pressed angularly upwards and away from the driver's chest. When the driver then loads the air bag, the driver and the steering wheel will have assumed a highly unfavourable angle, causing the driver to load the lower part of the steering wheel in the absence of any appreciable part of the air bag between him and the steering wheel. This phenomenon has two negative effects. Contact of the driver with the air bag results in that the pulse can no longer be utilized and in the steering wheel taking an unfavourable angle in relation to the driver's body. This effect is currently compensated for by making the air bag larger and more aggressive.

This problem has been observed in American studies on accidents involving cars equipped with air bags. Head injuries are reduced whereas breast injuries caused by the lower part of the steering wheel dominate.

Three parallel conditions have been tested in other tests, an unbelted driver with air bag, three-point safety harness and air bag, and solely a lap belt and air bag. The results showed that the best combination is the lap-belt and crash-bag combination, which resulted in the least injuries. The combination that includes a three-point harness is too rigid, since the air bag is optimised in respect of an unbelted driver. When solely a lap belt is used, the knees are unable to press forward the conventional steering wheel suspension and angle the steering wheel upwards, wherewith the hip-belt and crash-bag combination functions best due to this fact. The trials also showed that current air bags are not at all optimised towards a person wearing a three-point belt.

Another problem that occurs when the steering wheel suspension and the steering wheel are angled upwards is that the ability of the steering wheel suspension to absorb kinetic energy diminishes. The regulated collapse of the steering wheel suspension in the direction of car movement is influenced by the application of further deformation.

The problems associated with current steering wheel suspensions can be summarised as follows:

Impact of the knees with the knee-bar causes the steering wheel to be angled upwards, therewith limiting the protection afforded by the air bag in the lower part of the steering wheel. The steering wheel suspension must be strengthened, which increases both costs and weight. The absorption of energy offered by the steering wheel suspension in an axial direction has a limited effect, since as a result of this angling of the steering wheel the actual load does not act axially. Current crash-bag systems are optimised with respect to unbelted drivers. The air bags are often overdimensioned.

The introduction of fewer movable parts and therewith limitation of the steering wheel adjustment facilities is liable to result in the steering wheel moving further away from the driver and its upward angle reduced. It is therefore normal for current day steering wheel suspension systems intended for steering wheels that incorporate an air bag to lack adjustment facilities.

SUMMARY OF THE INVENTION

An object of the present invention is to overcome the aforesaid drawbacks.

This object is achieved with a steering wheel suspension method and steering wheel suspension system of the kind that are characterized by the features set forth in the claims.

Further features of the invention and advantages afforded thereby will be evident from the following detailed description of a preferred embodiment of the invention, this embodiment being described by way of example only and having no limiting effect on the scope of the invention. To facilitate an understanding of the following description, the text includes references to the accompanying drawings, wherewith equivalent or similar parts have been identified with the same reference sign.

DESCRIPTION OF THE PREFERRED EMBODIMENTS

Figure 1:
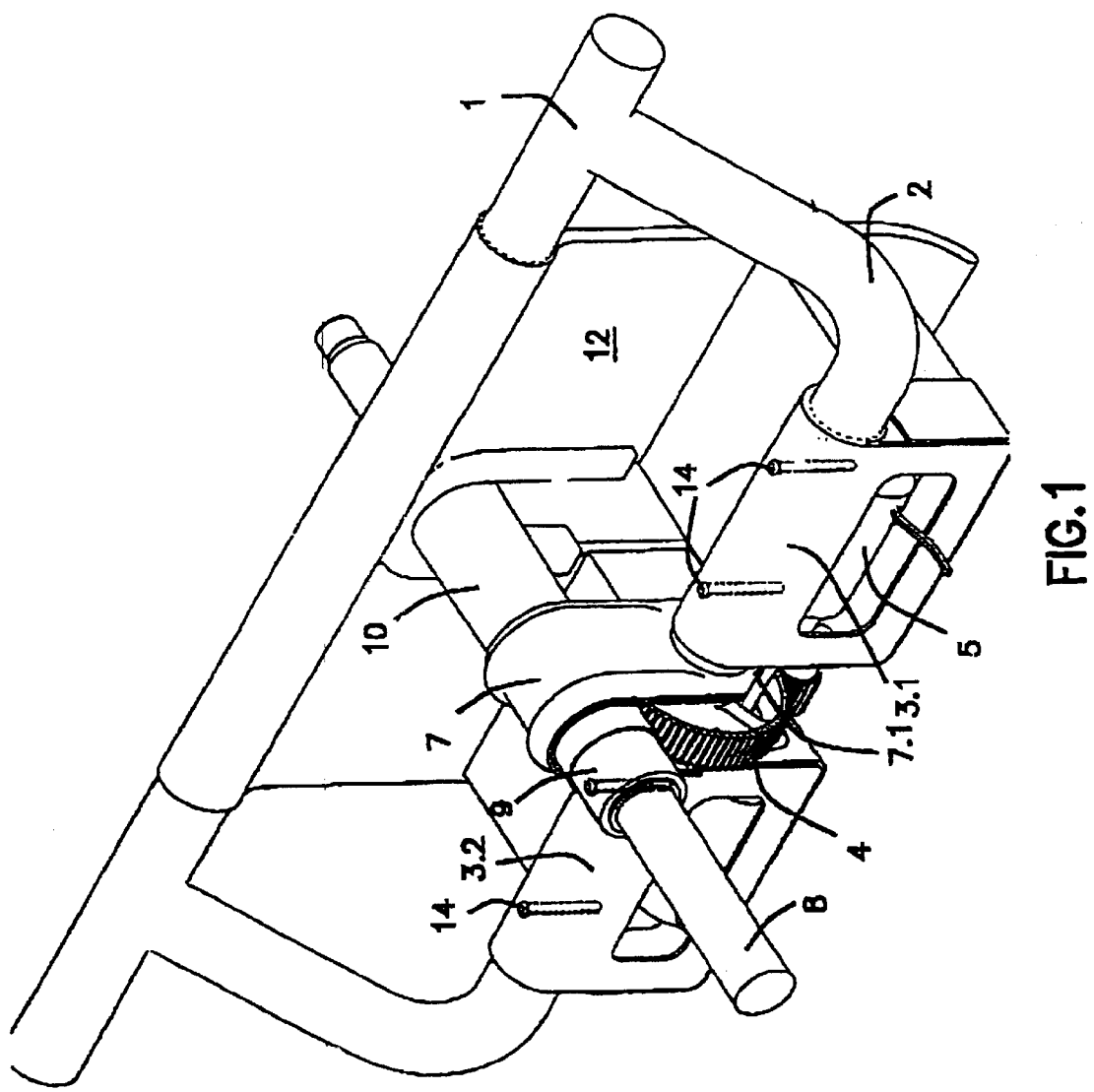
FIG. 1 is a schematic, perspective view of one embodiment of the present invention.

FIG. 1 is a schematic illustration of one embodiment of an inventive steering suspension system. The system is described with reference to an automobile (not shown) and is suspended from a steering wheel bar 1 that extends beneath the dashboard between the so-called A-posts of the automobile, these posts forming an attachment means for vehicle doors and windows.

The steering wheel suspension system includes a steering wheel that is provided with an air bag, and a steering wheel shaft 8 which is connected to the vehicle steering mechanism and pivotally supported in a holder device for steering purposes. The holder device is, in turn, mounted for rotation about a support shaft which extends transversely of the vehicle and which, under normal conditions, is locked in a specific starting position relative to the support shaft with the aid of a breakable locking means. Connected to the holder device is a drive means which in the event of a head-on collision functions to deliver to the holding device a force sufficient to overcome the locked state of the locking means and to swing the holder device in a direction which brings the steering shaft to a generally horizontal position and therewith bring the steeringwheel ring to a generally vertical position in front of the driver of the vehicle.

The holding device of the illustrated embodiment is provided with means for adjusting the vertical and depth positions of the steering wheel shaft, and therewith also the steering wheel, according to the driver's preference, when the holding device is located in its starting position.

A generally U-shaped tubular steering wheel suspension element 2 is fixedly fitted at its ends to the steering wheel bar 1, e.g. welded thereto. In the illustrated embodiment, the tubular steering wheel suspension element 2 includes the support shaft 2 around which the holder device pivots.

In the illustrated embodiment, the holder device includes a joint means 7 which supports the steering wheel shaft and which is pivotally mounted on the tubular steering wheel suspension element 2.

The steering wheel shaft 8 is pivotally mounted in a slide sleeve 9 which, in turn, can be moved axially in a tubular element 10 fixedly connected to the joint means 7. Provided on the underside of the slide sleeve is a row of teeth 7.2 which are intended to be placed in engagement with a complementarily designed adjustment mechanism.

In the illustrated case, the joint means 7 includes a U-bent plate joint having rotationally-stiffened plate bends, the free ends of said joint means being carried pivotally by the tubular steering wheel suspension element 2. A row of teeth 7.1 intended for engagement with a complementarily designed adjustment mechanism is provided at respective outer edges of the joint means 7, in the proximity of the pivotal attachment.

The tubular steering wheel suspension element 2 also carries two devices which are individually pivotal about said element, these devices having the form of a motor housing 3.1 and a motor housing 3.2, one on each side of the joint means 7. Each of these motor housings houses a respective electric motor 5 and 6 whose output shafts are provided with a pinion wheel.

The upper part of the holder device thus includes the joint means 7, and the lower part of said device includes the motor housings.

A cogwheel 4 provided with an external ring of teeth is mounted on the tubular steering wheel suspension element 2 between the motor housings 3.1 and 3.2 and internally of the U-shaped joint means 7. The cogwheel 4 has a diameter that permits engagement with the row of teeth 7.2 on the slide sleeve.

In the illustrated embodiment, a drive means is connected to the holder device such that in the event of a collision, the holder device will be caused to bring the steering wheel shaft to a collision position. In the illustrated embodiment, a movable knee-bar 12 is connected to the motor housings 3.1, 3.2 and when subjected to the force of the driver's knees functions to transfer these forces to the pivotally mounted motor housings. The knee-bar is connected to the housings while spaced axially from the rotary axis of said housings— the support shaft —by means 13, such as to generate torque in the holder device.

The knee-bar 12 comprises a tubular element which is pivotally mounted at the steering wheel bar 1 and on which there is mounted a downwardly hanging plate, which may be located between the steering wheel suspension and the dashboard or instrument panel, or may constitute a part of the dashboard, for instance.

There is preferably provided between the motor housings 3 and the knee-bar 12 an energy-absorbing link 13 which is adapted to deform when subjected to a specific load and therewith limit the collision violence to which the driver's knees and hips are subjected. Such deformation, however, will preferably not occur until the holder device has been rotated to its collision position.

Both electric motors 5 and 6 are fixedly mounted in respective motor housings. The motor housings are suspended from the tubular steering wheel suspension element 2 and when in a starting position are prevented from rotating about the tubular element 2 by means of rotation preventing means 14 which will not release the motor housing for rotation until subjected to a load that exceeds a specified level. The rotation preventing means may have the form of shear pins, spring-biased ball locks, hooks which yield when subjected to loads that exceed a specific level, or other means known to the person skilled in this art.

In normal driving conditions, the steering wheel suspension system will function in the same way as any other steering wheel suspension system, preferably with the advantage of providing two smooth steering wheel adjustment possibilities. The system enables the steering wheel to be adjusted depth-wise, i.e. the steering wheel may be moved towards and away from the driver for adjustment purposes. The steering wheel can also be tilted upwards and downwards, to a position in which the driver feels comfortable at the wheel.

Figure 2:
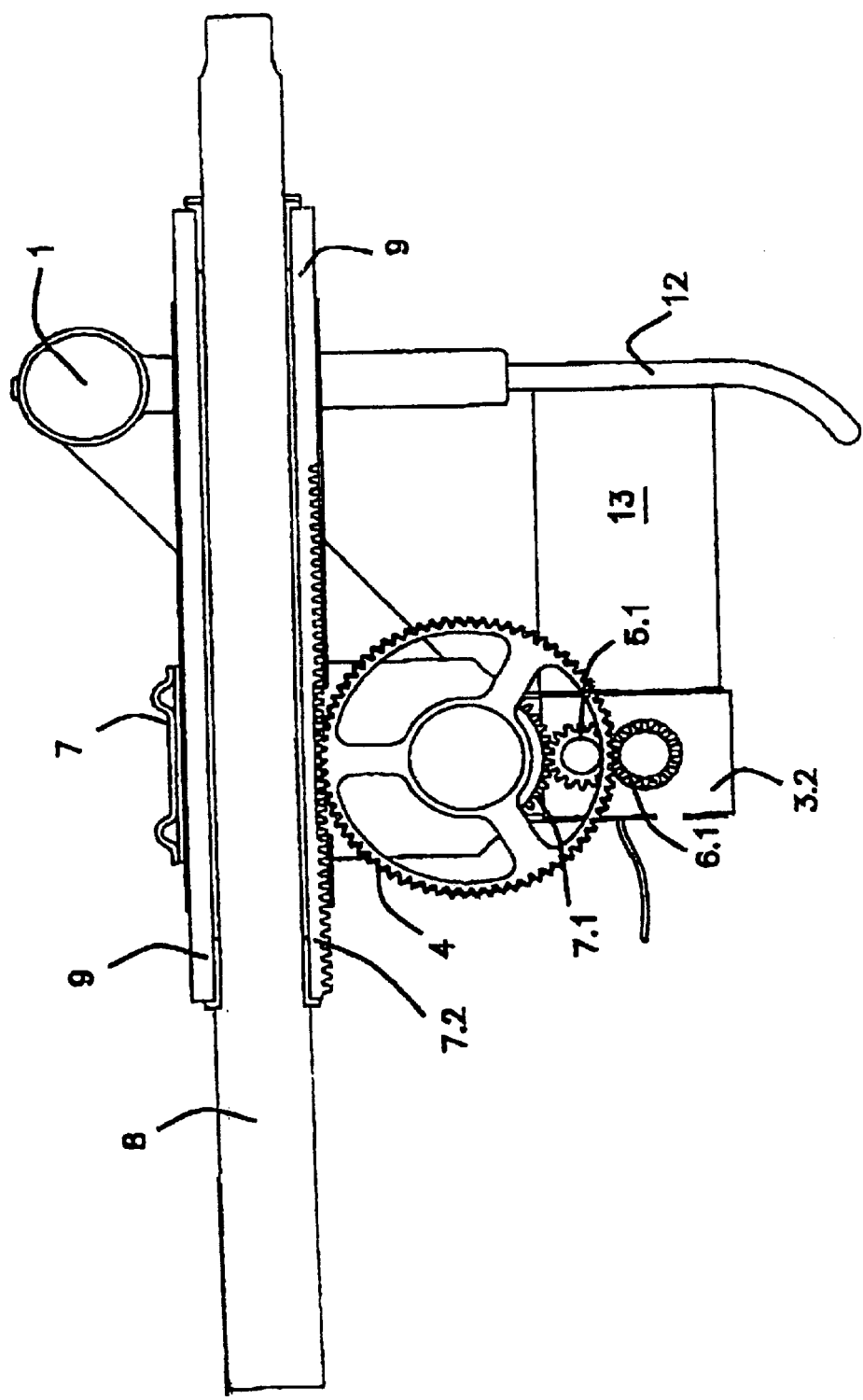
FIG. 2 is a partially broken side-view of the system shown in FIG. 1.

As will be evident from FIG. 2, the steering wheel is adjusted depth-wise by regulating the electric motor 6, whose pinion wheel 6.1 engages and rotates the cogwheel 4. When the cogwheel 4 rotates, the rack 7.2 is actuated to move the slide sleeve 9 either forwards or backwards, depending on the direction in which the cogwheel 4 is rotated by the electric motor 6. The steering wheel shaft 8 on which the steering wheel is mounted is fixed against movement axially in the slide sleeve but is mounted on bearings so as to be rotatable in said sleeve. The steering wheel shaft will thus accompany the slide sleeve 9 when it moves in an axial direction.

Figure 3:
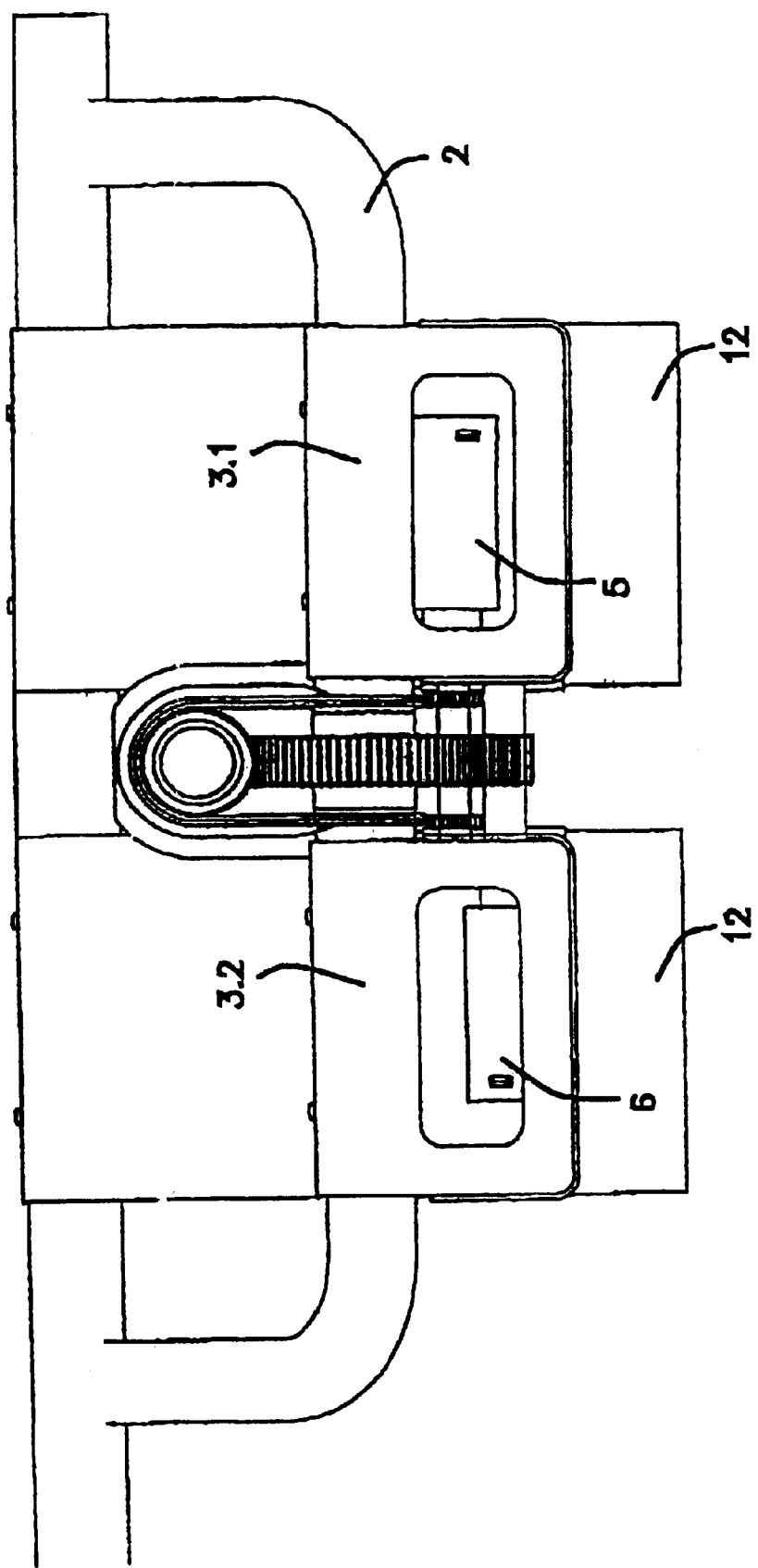
FIG. 3 is a front view of the system illustrated in FIG. 1.

As will be evident from FIGS. 2 and 3, the tilting movement is effected by the cogwheels 5.1 of the electric motor 5 actuating the toothed rings 7.1 of the joint means. Movement of the electric motor 5 causes the joint means 7 to pivot about the tubular steering wheel suspension element 2, therewith causing the angle of the steering wheel shaft and the steering wheel to change in accordance with the direction in which the cogwheels are rotated by the electric motor.

When no adjustment is made to the steering wheel setting, the shafts of the two electric motors 5 and 6 will be locked, and therewith prevent rotation of the motors and the cogwheels mounted on their respective output shafts. The adjustment mechanism is fixed internally.

The following situation occurs in the event of a collision. As the vehicle begins to slow down, the driver's body continues to move forward in the vehicle as a result of the mass inertia. The driver's knees, which are found relatively close to the furnishings, i.e. dashboard, etc., strike the knee-bar 12 carried by the steering wheel bar 1. The knee-bar 12 is therewith pushed forwards towards and against the motor housings. The energy absorbent 13 transfers this force between the knee-bar and the motor housings 3.1, 3.2 to the motor housings, which are therewith subjected to an equally as large force as the knee bar 12. The energy absorbent transfers the whole of this force without itself being deformed at this stage. When the load on the motor housing is sufficiently large, the shear pins or like devices holding the motor housings shear and the motor housings are rotated around the tubular steering wheel suspension element 2.

When the holder device has reached its end position, has taken the collision position, and the load on the knee-bar increases, the energy absorbent in the knee-bar will begin to deform and therewith limit the loading forces exerted by the driver's thighs.

By making the motor housings individually pivotal, they can be caused to swing to different extents around the pivot shaft 2, by suitable lever selections. The choice of distance between the pivot shaft and the row of teeth, or rack, 7.2 and the steering wheel shaft attachment at the joint means will enable relative regulation of different pivotal and linear-movement transmissions in the holder device. This enables, e.g. with locked motor shafts, the steering wheel shaft 8 to be moved axially towards the driver under the influence of the cogwheel 4 and, indirectly, of the locked cogwheel 6.1, as the holder device takes its collision position.

It is beneficial to achieve some form of energy absorption in the steering wheel suspension, when the driver's thorax exerts load on the air bag and therewith also the steering wheel suspension. This can be achieved, for instance, by allowing the steering wheel shaft to be pressed into the slide sleeve and deform the sleeve. Alternatively, the cogs on the slide sleeve may be allowed to deform against the cogwheel. Other arrangements for axially acting kinetic energy absorption known to the skilled person may also be applied.

There is thus provided a steering wheel suspension which in the event of a collision tilts the steering wheel shaft to a generally horizontal position in which the steering wheel and steering wheel shaft are positioned advantageously in front of the driver and therewith able to receive the driver and brake his/her movement.

As a result of the horizontal position of the steering wheel shaft, not upwards, the steering wheel will be moved against the driver and broken, and hence the air bag will come into contact with the driver at a very early stage of the collision sequence and the collapse of the steering wheel suspension can be dimensioned more readily.

Although the knee-bar 12 is preferably a one-piece structure, it may alternatively be divided into two or more individually movable parts. The knee-bar, or knee-bars, may also include an aperture or slots which will allow the steering wheel shaft 8 to swing freely. This slot may accommodate a slide bearing 11 or some other means that contributes towards guiding and/or stabilising the steering wheel shaft.

Although the embodiment described above includes electrically regulatable adjustment or setting facilities, it will be understood that in other embodiments of the invention the electric motors may be replaced with lockable, non-driven shafts that carry cogwheels. When these shafts are in a free state, the driver is able to adjust the depth and height positions of the steering wheel manually, and to lock the shafts against rotation with the aid of appropriate means when the steering wheel has been adjusted to a preferred position. Such an arrangement provides corresponding adjustment facilities even though these facilities are implemented manually. In another embodiment, the holder device may lack completely any adjustment facility.

For instance, the holder device can be caused to take a collision position by an explosive charge which is triggered in a manner similar to that with current air bags, or in some other way by means which in the event of a collision subject the holder device to a force sufficiently high for the holder device to take a collision position.

The system may also be provided with locking means which, when the steering wheel shaft has taken a collision position, functions to lock the steering wheel shaft in said collision position, e.g. by means of a hook device provided to this end.

The steering wheel suspension system may be provided with a holder device that is pivotal solely in one range, the end position of which constitutes said collision position.

In another embodiment, the steering wheel suspension system may include the suspension of pedals that can pivot around, e.g., the tubular steering wheel suspension element 2. The pedal suspension may be constructed in a manner such that when heavily pressed by the driver in the event of a collision results in a similar sequence of events in which, e.g., shear pins or like power or force monitoring device are able to trigger corresponding pivotal movement of the holder device.

What is claimed is:

1. A method of reducing the extent of injuries suffered by a driver in the event of a head-on collision of a vehicle including a steering wheel which is fitted with an air bag and which has a steering wheel shaft that is rotatably carried in a holder device for steering purposes, said holder device being, in turn, mounted for pivotal movement about a support shaft which is spaced from the steering wheel shaft and extends transversely in the vehicle and which under normal conditions is locked in a determined position relative to said support shaft by means of breakable locking means, the method comprising the steps of applying, at said head-on collision, a force at an impact surface arranged in the vicinity of the vehicle dashboard and connected to the holder device, therewith causing said holder device to swing about the support shaft and bring the steering wheel shaft to an essentially horizontal collision position in front of the driver, wherewith the steering wheel will be adjusted to a generally vertical position in front of the driver of the vehicle.

2. A method according to claim 1, wherein the steering wheel shaft is moved axially towards and against the driver when taking its collision position.

3. A steering wheel suspension system for a vehicle, the steering wheel suspension system comprising:
   a steering wheel assembly with a steering wheel shaft carried in a holder device that is pivotally carried by a support shaft and that is locked in a determined position by a breakable lock; and
   a movable impact surface that is connected to said holder device and spaced from said support shaft and that breaks said breakable lock upon application of a force to said impact surface to pivotally move said steering wheel shaft through an arc to a generally horizontal position.

4. A system according to claim 3, wherein an energy-absorbing connection part is arranged between the impact surface and the holder device; and wherein the energy-absorbent part is dimensioned to absorb energy solely in the event of a load that exceeds the force required to break said breakable lock and therewith release the holding device.

5. A system according to claim 3, wherein the holder device has two parts that can swing about the support shaft freely from one another, an upper part and a lower part; in that an angle locking device connects said upper and lower part for regulating their relative angular positions; and in that an axial regulating device is arranged in said upper part for receiving and adjusting the steering wheel shaft in an axial direction.

6. A system according to claim 3, wherein an energy-absorbing connection part is arranged between the impact surface and the holder device; and wherein the energy-absorbent part is dimensioned to absorb energy solely in the event of a load that exceeds the force required to break said breakable lock and therewith release the holding device.

7. A steering wheel suspension system for a vehicle, the steering wheel suspension system comprising:
   a steering wheel assembly with a steering wheel shaft carried in a holder device that is pivotally carried by a support shaft and that is locked in a determined position by a breakable lock, said holder device comprising two parts that are separately pivotable about said support shaft;
   an angle locking device that connects said two parts and regulates their relative angular positions;
   an axial regulating device in one of said two parts that adjusts said steering wheel shaft in an axial direction; and
   a movable impact surface that is connected to said holder device and that breaks said breakable lock upon application of a force to said impact surface to pivotally move said steering wheel shaft through an arc to a generally horizontal position.

8. A system according to claim 7, wherein the steering wheel shaft is mounted in a slide sleeve and is fixed against axial movement in said sleeve but rotatable therein, said sleeve being accommodated in and axially movable in one of said two parts; wherein an underside of the slide sleeve includes a row of teeth; wherein a cogwheel is provided for engagement with said row of teeth; wherein the cogwheel is mounted for rotation about the support shaft; and wherein an adjustable cogwheel is provided for engagement with the cogwheel for axial adjustment of the steering wheel shaft.

9. A system according to claim 7, wherein the steering wheel shaft is mounted in a slide sleeve and is fixed against axial movement in said sleeve but rotatable therein, said sleeve being accommodated in and axially movable in one of said two parts; wherein an underside of the slide sleeve includes a row of teeth; wherein a cogwheel is provided for engagement with said row of teeth; wherein the cogwheel is mounted for rotation about the support shaft; and wherein an adjustable cogwheel is provided for engagement with the cogwheel for axial adjustment of the steering wheel shaft.

10. A system according to claim 7, wherein an energy-absorbing connection part is arranged between the impact surface and the holder device; and wherein the energy-absorbent part is dimensioned to absorb energy solely in the event of a load that exceeds the force required to break said breakable lock and therewith release the holding device.

\* \* \* \* \*